United States Patent [19]

Hall, Jr. et al.

[11] 4,116,616

[45] Sep. 26, 1978

[54] FLASHLAMP ASSEMBLY UTILIZING DISPOSABLE FLASHLAMP ARTICLE

[75] Inventors: Harold H. Hall, Jr., Marblehead; Andre C. Bouchard, Peabody, both of Mass.

[73] Assignee: GTE Sylvania Incorporated, Stamford, Conn.

[21] Appl. No.: 790,217

[22] Filed: Apr. 25, 1977

[51] Int. Cl.² .............................................. F21K 5/02
[52] U.S. Cl. ......................................... 431/93; 362/13
[58] Field of Search ...................... 431/92, 93; 362/11, 362/13, 14; 354/132, 142, 143, 148

[56] References Cited

U.S. PATENT DOCUMENTS

| 3,795,477 | 3/1974 | Broadt | 431/93 |
| 3,980,421 | 9/1976 | Heeman et al. | 431/93 |
| 4,055,759 | 10/1977 | Bouchard et al. | 362/13 |
| 4,076,488 | 2/1978 | Hall | 431/93 |

Primary Examiner—Louis J. Casaregola
Attorney, Agent, or Firm—Lawrence R. Fraley

[57] ABSTRACT

A two-part flashlamp assembly which comprises an actuating mechanism and a disposable flashlamp article containing therein several, e.g. ten, percussively-ignitable flashlamps. The flashlamp article is designed for easy positioning on and removal from the actuating mechanism which comprises a handle and movable trigger, in addition to an elongated support member.

21 Claims, 4 Drawing Figures

FLASHLAMP ASSEMBLY UTILIZING DISPOSABLE FLASHLAMP ARTICLE

CROSS REFERENCE TO COPENDING APPLICATIONS

Three applications, listed under Ser. No. 756,926 (Haraden), 756,927 (Haraden) and 756,928 (Haraden) were filed Jan. 4, 1977 and are assigned to the same assignee as the present invention. Ser. No. 756,927 describes a flashlamp signal device which utilizes a slidable carriage to maintain alignment of the device's firing mechanism. Ser. No. 756,928 describes a flashlamp signal device in which the device's body member has a handle and movable trigger. Ser. No. 756,926 is an application for design for a flashlamp assembly. Another application, listed under Ser. No. 778,395 (Bouchard et al) and filed in the U.S. Patent and Trademark Office on Mar. 17, 1977, is also assigned to the same assignee as the present invention and defines a prolonged illumination means for use with a multiple flashlamp assembly.

An application listed under Ser. No. 778,394 (Ramsey) was filed concurrently with Ser. No. 778,395. Ser. No. 778,394, also assigned to the assignee of the present invention, defines an improved flashlamp assembly which incorporates a movable retention means to fixedly retain the assembly's carriage prior to firing of the flashlamps.

Another previous application Ser. No. 696,146 (H. H. Hall et al), filed June 14, 1976 and assigned to the same assignee as the present invention, defines a flashlamp assembly which employs a spring-loaded ratchet bar and a slidable member, e.g., helical torsion spring, which fires the assembly's flashlamps during movement of the ratchet bar. Said application is now U.S. Pat. No. 4,076,488.

Two additional applications filed June 14, 1976 are now issued as U.S. Pat. Nos. 4,070,145 (H. H. Hall et al) and 4,055,759 (Bouchard et al) and are also assigned to the same assignee as the present invention. Both of these patents describe percussive flashlamp signal devices wherein each of the lamps has a preenergized striker e.g. torsion spring, associated therewith.

BACKGROUND OF THE INVENTION

The present invention relates to flashlamp assemblies and more particularly to assemblies which utilize percussively-ignitable flashlamps.

In the flashlamp assemblies described in the aforementioned applications, the firing or actuating means and the multiple lamp package are combined to form a singular unitary structure. Accordingly, when the flashlamps of these assemblies have been expended, it is necessary to discard the entire device. Such a requirement can result in an unnecessary waste of material as well as increased replacement costs.

It is believed, therefore, that a percussively-ignitable flashlamp assembly which utilizes a disposable flashlamp article would constitute an advancement in the art.

OBJECTS AND SUMMARY OF THE INVENTION

It is a primary object of the present invention to enhance the flashlamp assembly art by providing an assembly which uses a disposable flashlamp article.

It is another object of the invention to provide an actuating mechanism and disposable flashlamp article for use within said assembly.

In accordance with one aspect of the invention, there is provided a flashlamp assembly which comprises a disposable flashlamp article including a housing and a plurality of percussively-ignitable flashlamps located within a chamber of the housing. A resilient striking mechanism effects firing of the lamps during movement through a longitudinal channel within the housing by selectively striking the lamp primers extending within the channel. The flashlamp assembly further comprises an actuating mechanism including a body member having handle and trigger portions. The mechanism further includes an elongated support adjoining the body member and having a ratchet member movably oriented therein. The ratchet engages the striking mechanism to effect movement thereof within the disposable article when the article is positioned on the support member.

In accordance with another aspect of the invention, there is provided a disposable flashlamp article having a housing which includes a base portion. The primers of a plurality of percussive flashlamps are located within the base portion and the respective envelopes extend within a chamber defined by the housing. The article also includes a striking mechanism which selectively strikes the flashlamp primers during movement of the striking mechanism through a longitudinal channel within the base portion.

According to still another aspect of the invention, there is provided an actuating mechanism for actuating a striking mechanism within a flashlamp article to effect selective firing of the lamps therein. The actuating mechanism includes a body member having a handle portion and a trigger portion. An elongated support adjoins the body member and a ratchet member is located within a longitudinal slot therein. The ratchet is adapted for engaging the article's striking mechanism to effect its movement within the article when the article is positioned on the elongated support.

DETAILED DESCRIPTION OF THE PREFERRED EMBODIMENTS

For a better understanding of the present invention together with other and further objects, advantages and capabilities thereof, reference is made to the following disclosure and appended claims in connection with the above described drawings.

Figure 1:
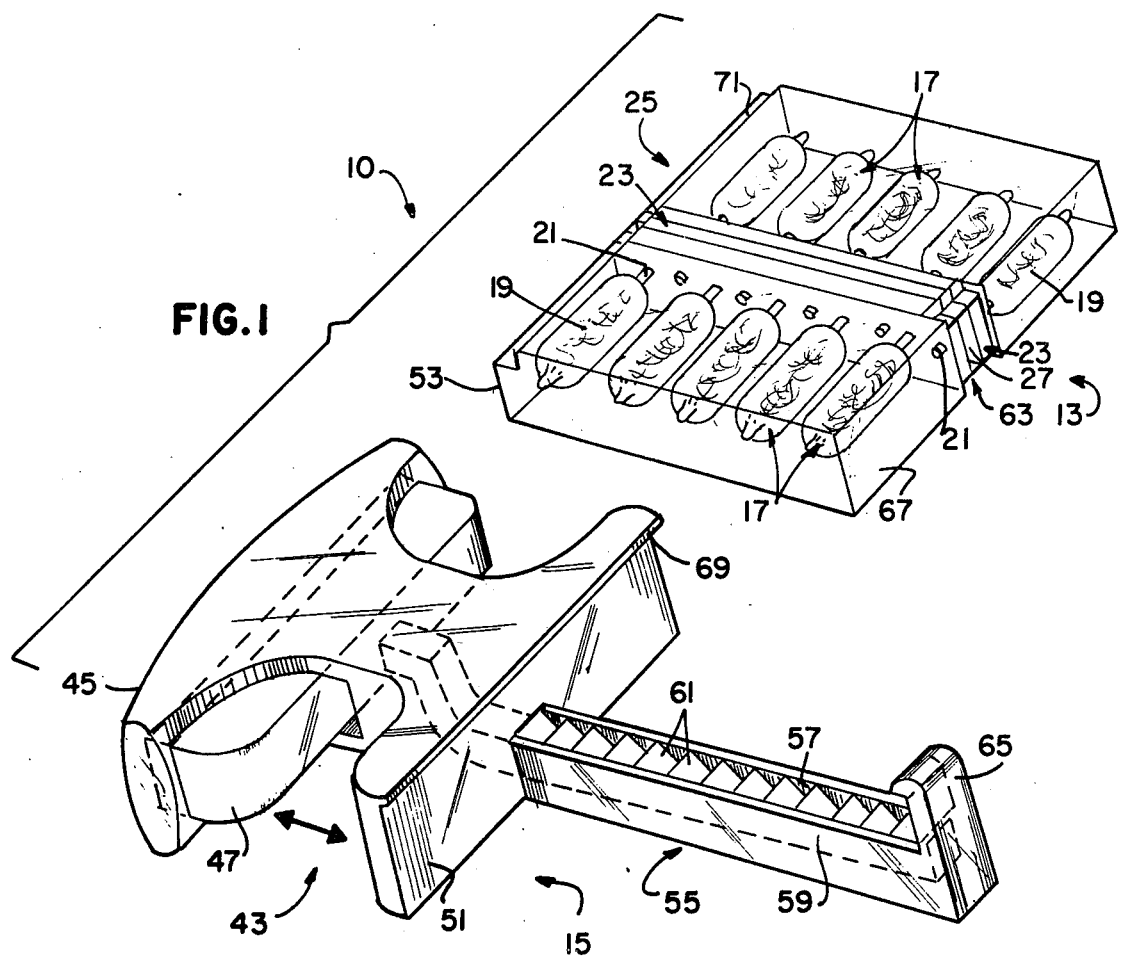
FIG. 1 is a perspective view of a flashlamp assembly in accordance with a preferred embodiment of the invention.

With particular reference to FIG. 1 there is shown a perspective view of a flashlamp assembly 10 in accordance with a preferred embodiment of the present invention. Assembly 10 comprises a disposable flashlamp article 13 and an actuating mechanism 15 to effect firing of a plurality of flashlamps 17 located within article 13. Each of the flashlamps 17 are of the percussively-ignitable variety and include a light-transmitting envelope 19 and a primer 21 projecting therefrom. By percussively-ignitable is meant those type of flashlamps wherein a quantity of combustible material e.g. shredded zirconium, is disposed with the lamp's envelope in addition to a combustion-supporting atmosphere, e.g. oxygen. Actuation or firing of the lamp is achieved by deforming the projecting primer tube 21 to cause a quantity of fulminating material located therein to deflagrate up through the tube and ignite the combustible material. An example of such a lamp is described in U.S. Pat. No. 3,535,063 (Anderson et al) which is assigned to the same assignee as the present invention.

Primers 21 are mounted within a base portion 23 of a housing 25 of article 13 and extend within a longitudinal channel 27 defined by base 23. As shown more clearly in FIG. 4, housing 25 defines at least one chamber 29 within which are positioned the envelopes 19 of lamps 17. Primers 21 are shown as extending within longitudinal channel 27. Article 13 preferably comprises two chambers 29 within housing 25 with both chambers separated by channel 27. Lamps 19 in each chamber 29 are arranged in an array which is preferably linear and substantially parallel to channel 27. Accordingly, each chamber 29 is positioned on opposing sides of base portion 23 and primers 21 project within channel 27 such that the primers of the lamps in one chamber are alternately positioned with respect to the primers of the lamps of the opposing chamber.

Article 13 further comprises a resilient striking mechanism, e.g. helical torsion spring 31, which is oriented within channel 27 and includes a protruding arm portion 33. Arm 33 is designed to strike the portion of each primer 21 located in channel 27 to deform said member and thus effect firing of the respective lamp 17. This selective firing is accomplished as spring 32 moves through channel 27 in direction "a" (shown in FIGS. 2 and 3). Each primer 21 serves to pre-stress arm 33 prior to the arm striking the next successive primer. As illustrated in FIG. 4, spring 31 is maintained in alignment within channel 27 by the substantially parallel upstanding walls 35 of base portion 23 and a retaining wall 37 upon which the helical portion 39 of spring 31 rests. In this position, an engagement arm 41 of spring 31 protrudes from housing 25 and is thus adapted for being engaged by actuating mechanism 15 to provide this movement.

Figure 2:
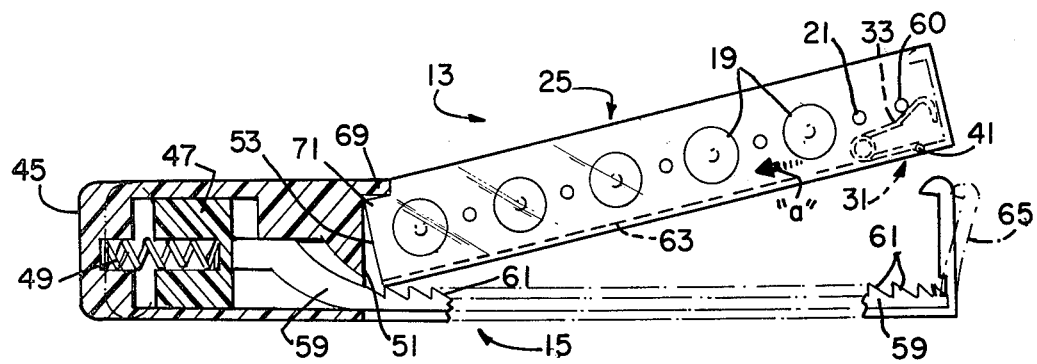
FIGS. 2 and 3 are side elevational views of the assembly of FIG. 1 illustrating the steps of inserting the disposable flashlamp article within the invention's actuating mechanism.
Figure 3:
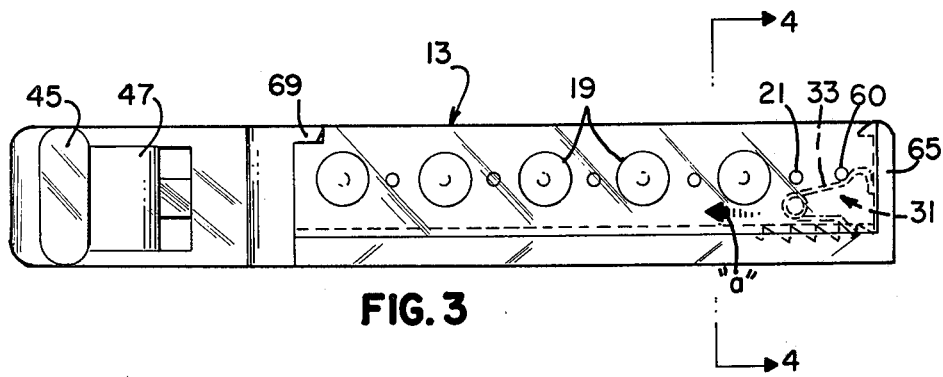
Figure 4:
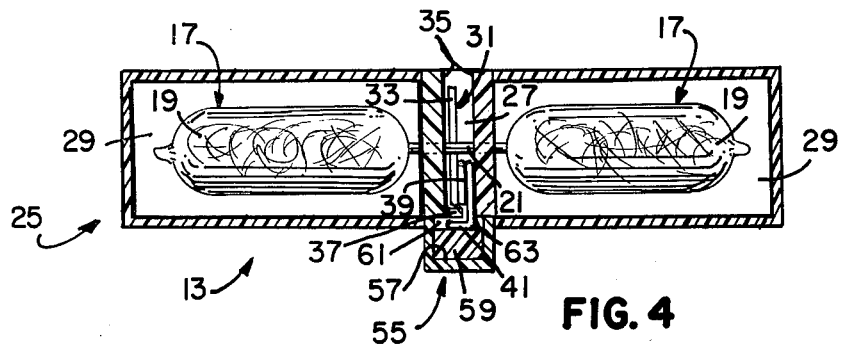
FIG. 4 is an end elevational view, partly in section, as taken along the line 4—4 in FIG. 3.

Mechanism 15 comprises a body member 43 which includes a handle portion 45 and a trigger 47 movably oriented within handle 45 in the manner shown in FIGS. 1—3. With particular reference to FIG. 2, a spring 49 is utilized to bias trigger 47 in a direction toward the positioned disposable article 13.

In operation, trigger 47 is manually depressed away from article 13 by the assembly's operator. This may be accomplished by the operator positioning handle 45 in the palm of his hand and thereafter engaging trigger 47 by one or more fingers. Release of the trigger will thus result in its return movement toward the positioned article 13. The above described reciprocal movement is particularly desirous in operating assembly 10.

Body member 43 further includes a seating portion 51 against which one side 53 of article 13 may be positioned when the article is firmly seated on mechanism 15. The mechanism additionally comprises an elongated support member 55 which is also adapted for having article 13 located thereon. Support 55 adjoins seating portion 51 and is preferably perpendicular thereto. Located within support 55 is a longitudinal slot 57 in which is movably positioned an elongated ratchet member 59. Ratchet 59 is joined at one end to trigger 47 and contains several teeth members 61 each of which is adapted for engaging arm 41 of spring 31 to effect movement of the spring through channel 27 during the aforedescribed reciprocal movement of the trigger. During sliding movement of ratchet 59 toward handle 45, one tooth 61 engages arm 41 to force spring 31 in direction "a". Accordingly, the protruding striking arm 33 will move free of the stressing primer 21 and strike the next adjoining primer. Once this has been accomplished and the trigger is released by the assembly's operator, ratchet 59 moves away from handle 45 due to the force exerted by spring 49. Arm 41 of spring 31 will slide over at least one of the respective teeth 61 during this return movement and thus remain stationary within channel 27. The next actuation of trigger 47 by the operator will in turn cause engagement of arm 41 by another of the teeth 61 to again effect movement of spring 31 along direction "a" and the subsequent striking of the next primer. A pin 60 is utilized to prestress striker arm 33 prior to the striking and deforming of the first of the primers 21. The first primer 21 to be deformed is shown in FIGS. 2 and 3 as being located immediately to the left of pin 60.

Alignment and positioning of article 13 on mechanism 15 is facilitated by providing a recess 63 within housing 25 immediately adjacent body portion 23. As shown in FIG. 4, a portion of support 55 is designed to fit within this recess. The above features assure that arm 41 of spring 31 will be substantially recessed within housing 25 and thus protected from accidental engagement by means other than mechanism 15. Additionally, these features permit recessing teeth 61 of ratchet 59 within support 55 such that they do not extend above the upper confines of the support.

Alignment and positioning of article 13 is further enhanced by provision of a retention member 65 on one end of support member 55. Member 65 positively engages one side 67 of article 13 when the article is positioned on the support. Member 65 also serves to exert a force against side 67 to thereby increase the seating force against the surface of the seating portion 51. Still another positioning and aligning feature of the invention is shown in the drawings and comprises a tang member 69 which forms a part of seating portion 51. Tang 69 positively engages side 53 of article 13 when the article is located on support 55 by aligning with and engaging a recess 71 within side 53. As shown, side 53 is opposite to the side 67 engaged by retention member 65.

A preferred use for flashlamp assembly 10 is a signal device. Because the assembly utilizes a plurality of percussively-ignitable flashlamps, it is capable of providing several luminous indications of relatively high intensity. This feature makes the assembly even more advantageous in situations requiring distress or warning signals. As has been described, assembly 10 is also capable of being operated single-handedly.

Thus there has been shown and described a flashlamp assembly which utilizes a disposable flashlamp article and an actuating mechanism for effecting firing of the lamps in said article. The ability to replace only the flashlamp article of the assembly significantly reduces the replacement cost of the invention in comparison to the assemblies described in the aforementioned copending applications.

It is understood that many of the features defined in the above copending applications may be incorporated within the instant invention. For example, the slidable carriage described in Ser. No. 756,927 may be used to further enhance the alignment of spring 31 within channel 27. The carriage could be located in an adjoining channel or slot and have a portion thereof extending within channel 27. Accordingly, the helical body 39 of the spring could be located thereon in much the same manner as the striking mechanism in Ser. No. 756,927.

While there have been shown and described what are at present considered the preferred embodiments of the invention, it will be obvious to those skilled in the art that various changes and modifications may be made therein without departing from the scope of the invention as defined by the appended claims.

What is claimed is:

1. A disposable flashlamp article for being actuated by an actuating mechanism including a body member having a seating portion thereon, an elongated support member adjoining said seating portion and including a longitudinal slot therein, and an elongated ratchet member movably oriented within said longitudinal slot, said article comprising:
   a housing defining at least one elongated chamber therein, said housing including a base portion adjacent said elongated chamber and defining a longitudinal channel therein substantially parallel to said elongated chamber;
   a plurality of percussively-ignitable flashlamps arranged in an array within said elongated chamber of said housing, each of said flashlamps including a light-transmitting envelope and a primer member projecting therefrom, each of said primer members mounted within said base portion of said housing and extending within said longitudinal channel; and
   a resilient striking mechanism movably oriented within said longitudinal channel and adapted for being engaged by said elongated ratchet member of said actuating mechanism when said housing of said article is positioned on said elongated support member and against said seating portion, said striking mechanism including a protruding arm portion for selectively striking each of said primer members extending within said longitudinal channel to effect firing of said flashlamps during movement of said striking mechanism within said channel, said striking mechanism moving within said channel to effect said firing in response to movement of said elongated ratchet member within said longitudinal slot of said elongated support member of said actuating mechanism.

2. The flashlamp article according to claim 1 wherein said array of flashlamps within said chamber is substantially linear.

3. The flashlamp article according to claim 1 wherein the number of elongated chambers is two, each of said chambers located on opposing sides of said base portion such that said longitudinal channel within said base portion is oriented substantially between said chambers.

4. The flashlamp article according to claim 3 wherein the primers of said flashlamps within the first of said chambers are alternately positioned within said longitudinal channel of said base portion with respect to the primers of said flashlamps within the second of said chambers.

5. The flashlamp article according to claim 4 wherein each of the arrays of flashlamps within said chamber is substantially linear.

6. The flashlamp article according to claim 5 wherein said substantially linear arrays of flashlamps are substantially parallel.

7. The flashlamp article according to claim 1 wherein said resilient striking mechanism comprises a helical torsion spring.

8. An actuating mechanism for actuating a disposable flashlamp article including a housing, a plurality of percussively-ignitable flashlamps within said housing, and a resilient striking mechanism for moving within said housing to selectively fire each of said percussively-ignitable flashlamps within said housing, said actuating mechanism comprising:
   a body member having a handle portion and a spring-loaded trigger portion movably oriented within said body member, said body member including a seating portion thereon for having said housing of said disposable flashlamp article positioned thereagainst;
   an elongated support member for having said housing of said disposable flashlamp article positioned thereon, said support member adjoining said seating portion of said body member and including a longitudinal slot therein; and
   an elongated ratchet member movably oriented within said longitudinal slot and joined at one end thereof to said trigger portion of said body member, said ratchet member engaging said resilient striking mechanism of said flashlamp article to effect movement of said striking mechanism within said article when said housing of said article is positioned on said support member and againt said seating portion, said striking mechanism effecting said selective firing of said flashlamps in response to said movement of said elongated ratchet member within said longitudinal slot of said elongated support member.

9. The actuating mechanism according to claim 8 wherein said elongated support member is substantially perpendicular to said seating portion of said body member.

10. The actuating mechanism according to claim 8 wherein said support member includes a retention member at one end thereof, said retention member positively engaging at least one side of said flashlamp article when said article is positioned on said support member to retain said side against said support member.

11. The actuating mechanism according to claim 10 wherein said seating portion of said body member includes a tang portion, said tang portion positively engaging an opposing side of said flashlamp article from said side engaged by said retention member when said article is positioned against said seating portion.

12. A flashlamp assembly comprising:
   a disposable flashlamp article comprising a housing defining at least one elongated chamber therein, said housing including a base portion adjacent said elongated chamber and defining a longitudinal channel therein substantially parallel to said elongated chamber, a plurality of percussively-ignitable flashlamps arranged in an array within said elongated chamber of said housing, each of said flashlamps including a light-transmitting envelope and a primer member projecting therefrom, each of said primer members mounted within said base portion of said housing and extending within said longitudinal channel, and a resilient striking mechanism movably oriented within said longitudinal channel, said striking mechanism including a protruding arm portion for selectively striking each of said primer members extending within said longitudinal channel to effect firing of said flashlamps during movement of said striking mechanism within said channel; and an actuating mechanism comprising a body member having a handle portion and a spring-loaded trigger portion movably oriented within said body member, said body member including a seating portion thereon for having said disposable flashlamp article positioned thereagainst, an elongated support member for having said disposable flashlamp article positioned thereon, said support member adjoining said seating portion of said body member and including a longitudinal slot therein, and an elongated ratchet member movably oriented within said longitudinal slot and joined at one end thereof to said trigger portion of said body member, said ratchet member engaging said resilient striking mechanism of said flashlamp article to effect movement of said striking mechanism within said longitudinal channel of said disposable flashlamp article when said article is positioned on said support member and against said seating portion.

13. The flashlamp assembly according to claim 12 wherein said array of flashlamps within said chamber is substantially linear.

14. The flashlamp assembly according to claim 12 wherein the number of elongated chambers is two, each of said chambers located on opposing sides of said base portion such that said longitudinal channel within said base portion is oriented substantially between said chambers.

15. The flashlamp assembly according to claim 14 wherein the primers of said flashlamps within the first of said chambers are alternately positioned within said longitudinal channel of said base portion with respect to the primers of said flashlamps within the second of said chambers.

16. The flashlamp assembly according to claims 15 wherein each of the arrays of flashlamps within said chambers is substantially linear.

17. The flashlamp assembly according to claim 16 wherein said substantially linear arrays of flashlamps are substantially parallel.

18. The flashlamp assembly according to claim 12 wherein said resilient striking mechanism comprise a helical torsion spring.

19. The flashlamp assembly according to claim 12 wherein said elongated support member is substantially perpendicular to said seating portion of said body member.

20. The flashlamp assembly according to claim 12 wherein said support member includes a retention member at one end thereof, said retention member positively engaging at least one side of said flashlamp article when said article is positioned on said support member to retain said side against said support member.

21. The flashlamp assembly according to claim 20 wherein said seating portion of said body member includes a tang portion, said tang portion positively engaging an opposing side of said flashlamp article from said side engaged by said retention member when said article is positioned against said seating portion.

* * * * *